Dec. 28, 1937. A. T. SMITH ET AL 2,103,560
ELECTRIC COOKING UTENSIL
Filed May 4, 1935 2 Sheets-Sheet 1
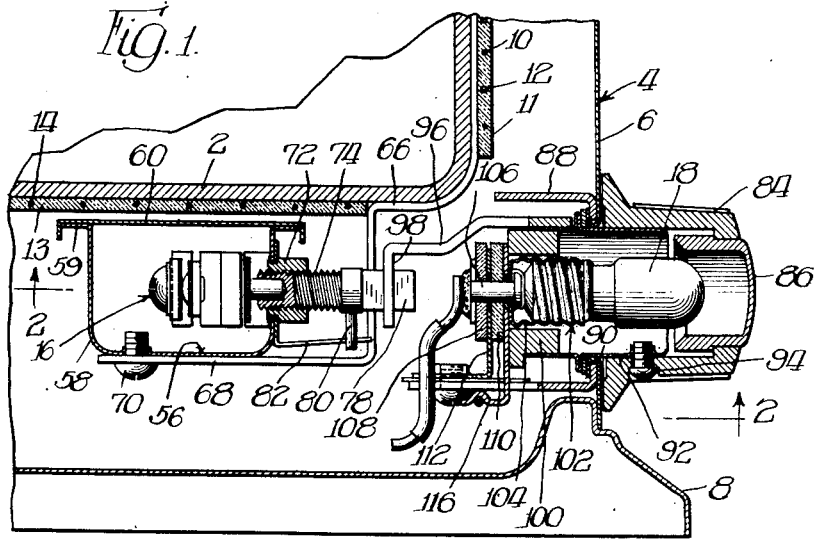
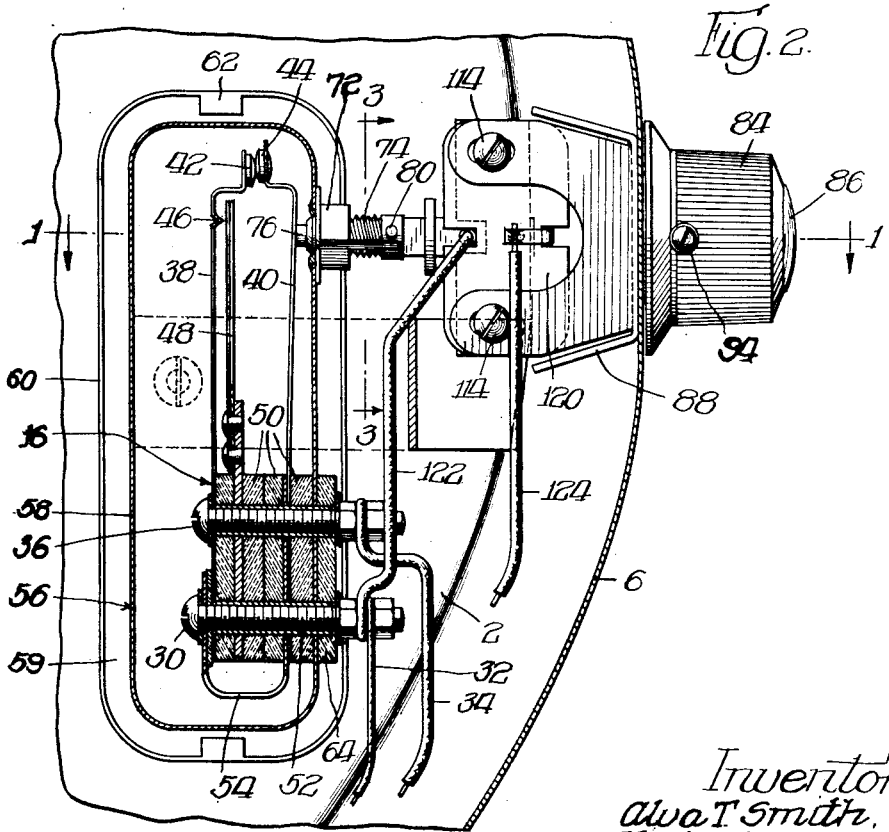
Inventors:
Alva T. Smith,
Herbert J. Moon,
By Wilkinson, Huxley, Byron & Knight
Attys

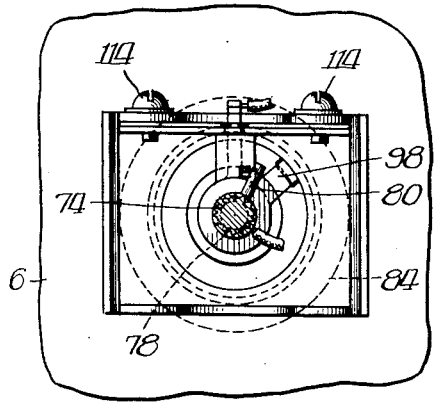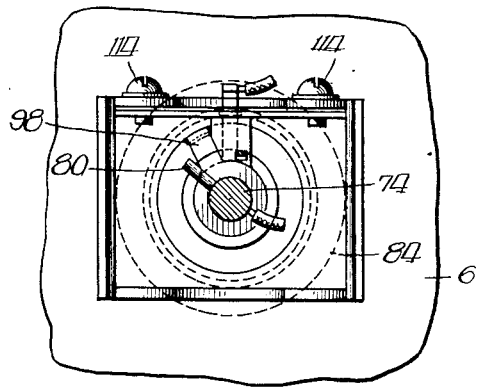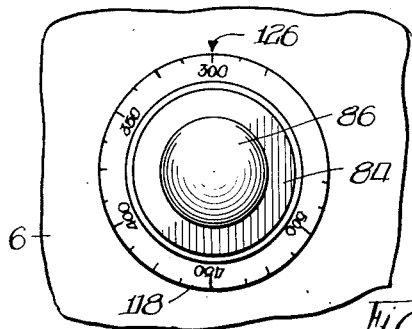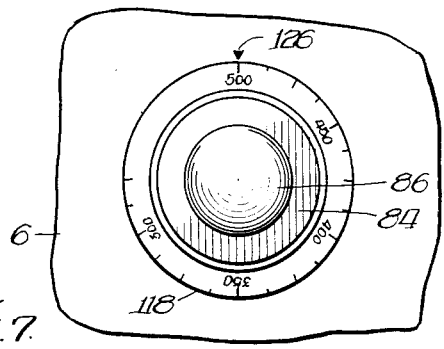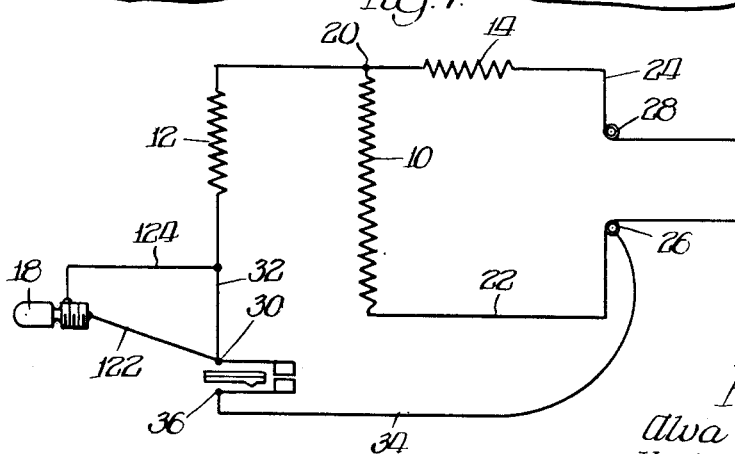

Patented Dec. 28, 1937

2,103,560

UNITED STATES PATENT OFFICE 2,103,560

ELECTRIC COOKING UTENSIL

Alva T. Smith and Herbert J. Moon, Milwaukee, Wis., assignors to National Enameling & Stamping Company, Milwaukee, Wis., a corporation of New Jersey Application May 4, 1935, Serial No. 19,796

26 Claims. (Cl. 219—20)

This invention appertains to cooking appliances, and more particularly to an improved electric cooking utensil of the casserole or roasting type.

One of the primary objects of our invention is the provision of an electric cooker having a high and low heating range, with novel means for automatically cutting out a resistance coil for high heat when a predetermined temperature is reached within the cooker, whereby the cooking can continue at the temperature desired, and without further attention on the part of the operator.

In electric cooking vessels of this character it is generally customary to preheat the vessel to a desired high temperature by the use of resistance heating elements before the food to be cooked is placed within the vessel, and when the vessel reaches the desired temperature, to place the food therein and cook under a low or slow heat. The housewife has no definite means of knowing when the desired temperature is reached, and it is generally customary to preheat the vessel for a certain length of time, at which time it is presumed that the desired high temperature has been reached. Obviously, this method is uncertain and also requires accurate timing on the part of the housewife.

It is, therefore, an important object of our invention to provide a pilot light on the cooking vessel in circuit with the high heat resistance element. When the desired temperature is reached, the high resistance element is automatically cut out by the thermostat. This causes the pilot light to go out, thus indicating to the housewife that the vessel is ready to receive the food. As the thermostat operates in accordance with the temperature within the cooking vessel, the high heat resistance element is cut in and out, thus causing the pilot light to flash on and then go out. This intermittent flashing indicates that the thermostat is holding the vessel to the desired temperature.

Another salient object of our invention is the provision of a thermostat incorporated with the cooker for automatically cutting out the high heat resistance element when the desired temperature is reached, and to provide a pilot light in circuit with the thermostat and indicating when said high temperature has been reached.

The present invention includes the idea of providing novel means for incorporating the pilot light and the thermostat in the cooking appliance, whereby a low voltage lamp can be utilized, and whereby the wattage is so distributed among the several heating coils that considerable load is removed from the thermostat thus reducing sparking of contact points so that long life will be obtained for the thermostat.

A further object of our invention is the provision of novel means for incorporating the pilot light or lamp directly within the knob utilized for setting the thermostat, so that the lamp will be protected and placed at a convenient point for observation by the housewife.

Another object within the purview of the present invention is to provide novel means for assembling the lamp socket and the knob, whereby the socket and bulb will be held stationary at all times irrespective of the turning of the knob, so that complicated brushes or other movable contacts for the lamp socket will be dispensed with.

A further object of our invention is the provision of novel means for connecting the thermostat within the cooker, whereby the heat will be instantly conducted to the thermostat from the cooking vessel, and whereby the thermostat can be easily and quickly removed from the vessel for repair, and disconnected from the control knob.

The invention also comprehends the provision of a plurality of heating coils for the cooker, with a thermostat for cutting out only one coil when a desired high temperature is reached, whereby to reduce the work of the thermostat and to leave the other coils in use, which coils function to eliminate radio interference by dissipating the inductive effect created when the circuit is broken through the high heating coil by the thermostat.

A still further object of our invention is to provide a novel thermostat and pilot light arrangement for electric cookers of the above character, which will be durable and efficient in use, one that will be simple and easy to manufacture, and one which can be placed upon the market and incorporated with a cooker at a comparatively low cost.

Other objects, features, capabilities and advantages are comprehended by the invention, as will later appear and as are inherently possessed thereby.

Referring to the drawings:

Figure 1 is a fragmentary vertical cross-sectional view through an electric cooking appliance made in accordance with the present invention and taken in a plane represented by line 1—1 of Figure 2 of the drawings;

Figure 2 is a horizontal view in cross-section of the apparatus shown in Figure 1 of the drawings and taken in the planes represented by the line 2—2 thereof;

Figure 3 is a fragmentary vertical cross-sectional view taken in the plane indicated by line 3—3 of Figure 2 of the drawings;

Figure 4 is a view similar to Figure 3 showing a different setting for the thermostat control means;

Figures 5 and 6 are fragmentary views in elevation of the knob for the thermostat control means and showing the settings thereof for the positions of the control means in Figures 3 and 4, respectively; and Figure 7 shows a diagrammatic view of a wiring diagram incorporating the various electrical elements of the circuit for the cooking appliance shown in Figure 1 of the drawings.

Referring now more in detail to the drawings, an electric cooking appliance made in accordance with the present invention is shown as comprising an inner vessel 2, and an outer spaced shell or housing 4. The outer shell or housing 4 can include a side wall 6 and a base 8. The inner vessel 2 is preferably heat insulated from the shell 4 by the use of suitable packing, such as mineral wool (not shown). The inner vessel 2 may or may not receive removable cooking pots and pans.

The inner vessel 2 is heated by independent side heating elements or coils 10 and 12, and a bottom heating coil 14 enclosed within the insulating strips 11 and 13, respectively. These coils are indicated in the wiring diagrams, and the coil 10 and the bottom coil 14 are in constant series with one another, while the coil 12 is automatically cut in and out by means of the thermostat 16, which will be later described in detail. The coil 12 is only used for high heat, and is preferably of the 800 watt type, while the coils 10 and 14, when combined, are preferably of the 200 watt type. A pilot light 18 is utilized for indicating when a desired high temperature has been reached in the cooker.

By referring to Figure 7, it will be noted that the coils 10 and 14 are connected together at the terminal 20, and that their opposite ends 22 and 24, respectively, lead to the suitable contact posts or prongs 26 and 28, whereby the cooker can be connected with a conventional house circuit. One end of the high heating coil 12 is connected to the coils 10 and 14 by means of the common terminal 20. The other end is carried to the contact post 30 of the thermostat 16. A part of this end indicated by 32 is so proportioned in length that the proper voltage drop is obtained on the lamp 18 which is shunted around it. A conductor wire 34 from contact post 36 of the thermostat 16 to post 26 completes this part of the circuit.

The thermostat 16 is of the bimetallic type and includes resilient electric conducting fingers 38 and 40 having inturned terminals carrying contact points 42 and 44, respectively.

The resilient finger 38 may be provided with a struck-in bight portion 46 for facing relation to the bimetallic thermostatic member 48. The inner ends of the resilient fingers 38 and 40 and the thermostatic element 48 are held in place by insulating blocks 50. Terminal posts 30 and 36 clamp the insulating blocks and the fingers and thermostatic element in place, and the posts extend through insulating sleeves 52. One post 36 is electrically connected to the finger 38, and the other post 30 is electrically connected to the finger 40 by means of an electric conducting strip 54.

The fingers 38 and 40 and the thermostatic element 48 are preferably held within a suitable casing 56. This casing 56 includes a body 58 provided with a flange 59 to which is removably secured cap 60, by suitable clips 62. The binding posts 30 and 36 extend through the body of the casing and are insulated from the casing by the insulating block 64 disposed outwardly of the casing 56 and the insulating block 50 adjacent thereto on the inside thereof.

In order to quickly conduct heat from the inner vessel 2 to the thermostat, a supporting bracket or clip 66 formed of aluminum, or other heat conducting material, is rigidly held in direct contact with the side of vessel 2 by being placed under insulating strip 11 before coils 10 and 12 are wound thereon, and this bracket or clip has formed integral therewith the inwardly directed arm 68, which extends under the bottom wall of the vessel 2. A single screw 70 is utilized for connecting the casing 56 with the bracket, and the casing is disposed adjacent to the bottom wall of the inner vessel 2 so that the same also will receive heat directly from said vessel, yet spaced therefrom sufficiently to prevent warping thereof.

We form the thermostat adjustable so that the cooker can be set at any preferred temperature, and consequently one side wall of the body of the casing 56 has rigidly connected therewith a nut 72, through which extends a threaded adjusting stem or shaft 74. The inner end of the threaded adjusting stem is provided with an insulating point 76 for engaging the resilient leaf or finger 40.

By adjusting the threaded shaft or stem 74, the fingers 40 and 38 can be moved so that the finger 38 will be disposed nearer to or further from the thermostatic element 48. This allows the breaking of the circuit by the element 48 at different temperatures.

The outer end of the adjusting shaft 74 is provided with a non-circular shank 78 and a radially extending stop pin 80. Arranged in the path of the stop pin 80 is a rigid stop arm 82 held in place by the nut 72, and the stop pin and arm limit the turning movement of the shaft in both directions.

Novel means is provided for actuating the shaft 74 from the exterior of the cooker. This means embodies a manipulating knob 84, which can be formed from "bakelite" or similar material. The central portion of the knob 84 is provided with a transparent or translucent "bull's eye" 86, so that rays of light emanating from the low voltage bulb 18 can be readily seen by the operator.

Particular stress is laid on the novel means of forming and assembling the lamp socket and the turning knob, as by our means the lamp and its socket are held stationary during the turning of the knob. In accordance with our invention, a rigid bracket 88 is provided, and this bracket is fitted on the inside of the shell 4 in engagement with the side wall 6 thereof and adjacent to the thermostat 16. The bracket 88 is formed with a central opening, which aligns with an opening 90 in the side wall 6 of the shell, and the side wall 6 adjacent the opening 90 is crimped about the bracket 88 for rigidly holding the same in position.

Rotatably mounted within the bracket is a sleeve 92, to which may be connected, by means of a set screw 94 or the like, the knob 84. Spot welded or otherwise secured to the sleeve 92 is a rearwardly directed operating arm 96 having a foot 98 provided with a non-circular opening for receiving the non-circular shank 76 of the adjusting shaft 74. A bushing of insulating material 100 is received within the sleeve 92 and rotates with said sleeve, and this bushing rotates around a lamp socket 102 for threadedly receiving the lamp 18.

The lamp socket 102 includes the usual electric conducting shell 104 and central contact 106, which is in the nature of a rivet, in that its opposite ends are upset for holding the insulating washers 108 and 110 and shell 104 in place.

Rigidly secured between the insulating washers 108 and 110 is a supporting bracket 112, which is connected by means of screws 114 to the main bracket 88. This rigidly holds the lamp socket in place. Extending between the insulating washer 110 and insulating bushing 100 and electrically connected with the shell 104, is a depending electric conducting bus bar 116, for a purpose which will be later set forth. At this point, it is to be noted that the supporting bracket 112 has a vertical portion arranged in the path of the operating arm 96. This limits the turning movement of the operating arm 96 and sleeve 92 attached thereto, in both directions. The vertical portion of bracket 96 is in alignment with the bus bar 116 and enough wider so that when arm 112 is stopped, it does not make electrical contact with the bus bar 116. This stop arrangement is the one which limits the dial 118 on knob 84 in its high and low position. The stop arrangement on the thermostat 16 is in use only from the time the thermostat is calibrated until it is put in place in the roaster.

In assembling the lamp socket, knob, etc., the insulating bushing 100 is placed around the shell 104 of the lamp socket, and the bushing with the lamp socket is placed within the rotatable sleeve 92. The sleeve 92 is then placed through the opening in the side wall 6 of the shell, and the bracket 112 is rigidly connected by means of screws 114 with the main bracket 88. Slots can be formed in the main bracket 88 for the screws 114, whereby the bracket 116 can be slid back and forth to correctly position the sleeve 92 and the lamp socket relative to the knob. A thin sheet of mica 120 is interposed between the supporting bracket 116 and the main bracket 88, so as to insulate the bar 116 and keep a wire 122 aligned with the stop 112. The knob 84 is now rigidly connected with the sleeve 92 by means of the set screw 94, it being understood that the lamp 18 is threaded into its socket prior to the placing of the knob in position.

As stated, the thermostat 16 is held in place by the single screw 70, and during the placing of the thermostat in position the non-circular end 78 of the adjusting shaft 74 is placed within the non-circular opening of the adjusting arm 96.

From the foregoing description, it can be seen that the assembling of the thermostat and the pilot light socket is an easy one, and that a new thermostatic unit 16 can be quickly substituted for a worn-out one, without the necessity of sending the entire roaster back to the factory for repair.

Again referring to Figure 7 in connection with Figures 1 and 2, it will be noted that the high heating coil 12 is connected to terminal post 30, by means of the resistance wire 32. This wire 32 can be a continuation of coil 12 or a separate piece of resistance wire. The terminal post 30 is connected to the resilient leaf 46 by means of the connector strip 54. As heretofore stated, the other end of coil 12 is electrically connected with the terminal 20. Also electrically connected with the terminal post 30 is the short conductor wire 122, which is connected with the central contact 106 of the lamp socket. The lamp circuit is completed by the lamp socket 104 in electrical contact with the bus bar 116. To the bus bar 116 is attached the wire 124 which is electrically connected to coil 12 at a distance from the post 30 indicated by the length 32.

By this arrangement it is to be noted that the low voltage lamp is shunted across the main high heat circuit in such a way as to give the proper voltage to this low voltage lamp without the use of transformers or other auxiliary apparatus.

By this arrangement we are enabled to use a low voltage lamp of the radio panel type, which gives long hours of service in contradistinction to miniature high voltage lamps placed across the entire voltage drop of the appliance.

As brought out in the objects of the specification, the thermostat unit 16 cuts coil 12 only in and out of the heating circuit, this coil being used for the high heat, and thus when the roaster or casserole is in service the coils 10 and 14 are constantly in use. This minimizes the work of the thermostat unit 16, and during the cutting in and out of the coil 12 the coils 10 and 14 act as choke coils and prevent surging of the current, which eliminates radio interference. This is highly important in restricted neighborhoods. The coil 12 being cut across the circuit for the coils 10 and 14 allows the coils 10 and 14 to dissipate the inductive effect created when the circuit is opened and closed by the thermostat to the coil 12.

From the foregoing description it can be seen that we have provided an efficient electric cooking device in which it is merely necessary for the housewife to set the control knob 84 to the desired heat, and to then place the food in the cooker when the pilot light goes off or intermittently flashes, which indicates when the cooker is ready to receive the food.

As previously described, the knob is provided with a dial 118 having graduations indicating different degrees of heat which may be turned into any desired position as indicated by the arrow 126.

While we have herein described and upon the drawings shown an illustrative embodiment of the present invention, it is to be understood that the invention is not limited thereto but may comprehend other constructions, arrangements of parts, details and features without departing from the spirit of the invention.

We claim:

1. In an electric cooking device having a receptacle provided with a bottom and a side wall, the combination of a low heating circuit including heating elements, one of said elements being disposed adjacent the bottom and another of said elements being disposed adjacent the side walls of said receptacle, said elements being connected in series, a high heating circuit including a heating element disposed adjacent one of said walls and electrically connected in parallel with one of the elements of said low heating circuit, and a thermostat for disconnecting the heating element of the high heating circuit when a desired temperature is reached.

2. In an electric cooking device having a receptacle provided with a bottom and a side wall, the combination of a low heating circuit including heating elements, one of said elements being disposed adjacent the bottom and another of said elements being disposed adjacent the side walls of said receptacle, said elements being connected in series, a high heating circuit including a heating element disposed adjacent the side wall of said receptacle and electrically connected in parallel with one of the elements of said low heating circuit, and a thermostat for disconnecting the heating element of the high heating circuit when a desired temperature is reached.

3. In an electric cooking device, the combination of a low heating circuit connected to a source of electrical energy and including a plurality of heating elements connected in series, a high heating circuit including at least one heating element electrically connected in parallel with one or more but not all of said serially connected heating elements of the low heating circuit, and a thermostat for disconnecting the heating element of the high heating circuit from the low heating circuit when a predetermined temperature is reached, said low heating circuit serving as a choke coil during operation to eliminate radio interference upon the cutting in and out of the high heating circuit.

4. In an electric cooking device, the combination of a low heating circuit including a plurality of heating elements electrically connected in series, a high heating circuit including at least one heating element electrically connected in parallel to one or more but not all of said first-named elements, means automatically disconnecting the heating element of the high heating circuit from the low heating circuit when a predetermined temperature is reached, said low heating circuit serving as a choke coil during operation to eliminate radio interference upon the cutting in and out of the high heating circuit, and a low voltage pilot lamp shunted across a portion of said high heating circuit having the desired voltage drop for indicating the operation of said means.

5. In an electric cooking device, the combination of a low heating circuit including a plurality of heating elements electrically connected in series, a high heating circuit including at least one heating element electrically connected in parallel to one or more but not all of said first-named elements, said high heating circuit including means automatically operating to disconnect the heating element of the high heating circuit from the low heating circuit when a predetermined temperature is reached, said low heating circuit serving as a choke coil during operation to eliminate radio interference upon the cutting in and out of the high heating circuit, said high heating circuit being provided with a portion comprising a wire producing a low voltage drop, and a pilot light shunted across said portion for indicating the operation of said means.

6. In an electric cooking device, the combination of a low heating circuit including a plurality of heating elements electrically connected in series, a high heating circuit including at least one heating element electrically connected in parallel to one or more but not all of said first-named elements, said high heating circuit including a thermostat for automatically disconnecting the heating element thereof from the low heating circuit when a predetermined temperature is reached, said low heating circuit serving as a choke coil during operation to eliminate radio interference upon the cutting in and out of the high heating circuit, said high heating circuit being provided with a portion connected to said thermostat comprising a wire producing a low voltage drop, and a pilot light shunted across said portion to indicate by the flashing thereof that the desired temperature is being maintained in the cooking vessel.

7. In an electric cooking device, the combination of an inner receptacle and an outer casing, an electric heating circuit for said receptacle, said circuit including a thermostat having an adjustable shaft, means rotatably mounted in said outer casing for operating said shaft, and means in said circuit disposed within said rotatable operating means and fixed in relation to said casing for indicating exteriorly of said casing operation of said circuit.

8. In an electric cooking device, the combination of an inner receptacle and an outer casing, an electric heating circuit for said receptacle including a thermostat provided with an adjustable shaft for varying the operation of said circuit, means mounted in said outer casing for setting said thermostat, said means being readily detachable coupled to said shaft, and a pilot light in said circut within said first-named means for indicating the operation of said thermostat.

9. In an electric cooking device, the combination of an inner receptacle and an outer casing, an electric heating circuit for said receptacle including a thermostat having means for varying the operation of said circuit, means rotatably mounted in said outer casing cooperating with said first-named means for setting said thermostat, and a pilot light for said circuit mounted within said means and non-rotative with respect to said outer casing.

10. In an eletric cooking device, the combination of an inner receptacle and an outer casing, an electric heating circuit for said receptacle including a thermostat associated with said inner receptacle and having means for varying the operation of said circuit, a bracket of heat conducting material for readily detachably connecting said thermostat to said inner receptacle, and means mounted in said outer casing and operable from the exterior thereof and cooperating with said first-named means for setting said thermostat.

11. In an electric cooking device, the combination of an inner receptacle and an outer casing, an electric heating circuit for said receptacle including a thermostat associated with said inner receptacle and having means for varying the operation of said circuit, said thermostat having a casing of heat conducting material, a bracket of heat conducting material connected to said inner receptacle and to the thermostat for disposing said casing in close proximity to said inner receptacle to maintain the desired temperature thereof, and means mounted in said outer casing and operable from the exterior thereof for setting said thermostat, said last-named means having means cooperating with said first-named means to provide a readily detachable connection therebetween.

12. In an electric cooking device, the combination of a casing, a thermostat disposed within said casing and being provided with an adjustable shaft, means for setting said thermostat including a sleeve rotatably mounted in said casing and having an arm coupled to said shaft, a pilot light operable in conjunction with said thermostat and disposed within said sleeve, and a knob mounted on said sleeve exteriorly of said casing for rotation thereof.

13. In an electric cooking device, the combination of a casing, an electric heating circuit including a thermostat disposed within said casing and being provided with an adjustable shaft, means for setting said thermostat including a rotatable sleeve mounted in said casing and having an arm coupled to said shaft, a knob mounted on said sleeve exteriorly of said casing for rotation thereof, a lamp socket fixed in respect to said casing and being electrically connected in said heating circuit, and a pilot light mounted within said socket and within said sleeve and knob for indicating operation of said thermostat exteriorly of said casing.

14. In an electric cooking device, the combination of a casing, a thermostat disposed within said casing and being provided with an adjustable shaft, means for setting said thermostat including a sleeve rotatably mounted in said casing and having an arm coupled to said shaft, a pilot light operable in conjunction with said thermostat and disposed within said sleeve, a knob mounted on said sleeve exteriorly of said casing for rotation thereof, and means engageable by said arm for limiting rotation of said sleeve.

15. In an electric cooking device, the combination of a casing, an electric heating circuit including a thermostat disposed within said casing and being provided with an adjustable shaft, means for setting said thermostat including a sleeve rotatably mounted in said casing and having an arm coupled to said shaft, a knob mounted on said sleeve exteriorly of said casing for rotation thereof, a lamp socket having a bracket connected to and insulated from said casing for non-rotatively mounting said socket in respect to said casing and being electrically connected in said heating circuit, a pilot light mounted within said socket and within said sleeve and knob for indicating operation of said thermostat exteriorly of said casing, said bracket having a portion engaged by said arm to limit movement of said sleeve.

16. In an electric cooking device, the combination of a casing, an electric heating circuit including a thermostat disposed within said casing and being provided with an adjustable shaft, means for setting said thermostat including a sleeve rotatably mounted in said casing and having an arm coupled to said shaft, a knob mounted on said sleeve exteriorly of said casing for rotation thereof, a bracket fixed to said casing, a lamp socket having a bracket connected to and insulated from said casing for non-rotatably mounting said socket in respect to said casing, said socket being electrically connected to said heating circuit, said electrical connection including a shell and a bus bar connected thereto, a pilot light mounted within said shell and within said sleeve and knob for indicating operation of said thermostat exteriorly of said casing, said second-named bracket having a portion aligned with said bus bar but wider than the same engaged by said arm to limit movement of said sleeve and to protect said bus bar.

17. An electrical circuit comprising a low heating circuit connected to a source of electrical energy and including a heating unit, a high heating circuit including a heating unit electrically connected in parallel with a portion only of the heating unit of said low heating circuit, and a thermostat for automatically connecting and disconnecting said high heating circuit and said low heating circuit, said low heating circuit serving as a choke coil during operation to eliminate radio interference upon the cutting in and out of the high heating circuit.

18. An electrical circuit comprising a low heating circuit connected to a source of electrical energy and including a heating unit, a high heating circuit including a heating unit electrically connected in parallel with a portion only of the heating unit of said low heating circuit, means for connecting and disconnecting said high heating circuit and said low heating circuit, when a predetermined temperature is reached, said low heating circuit serving as a choke coil during operation to eliminate radio interference upon the cutting in and out of the high heating circuit and a low voltage pilot lamp shunted across a portion of said high heating circuit having the desired voltage drop for indicating the operation of said means.

19. An electrical circuit comprising a low heating circuit connected to a source of electrical energy and including a heating unit, a high heating circuit including a heating unit electrically connected in parallel with a portion only of the heating unit of said low heating circuit, a thermostat for automatically connecting and disconnecting said high heating circuit and said low heating circuit, said low heating circuit serving as a choke coil during operation to eliminate radio interference upon the cutting in and out of the high heating circuit, and a low voltage pilot lamp shunted across a portion of said high heating circuit having the desired voltage drop for indicating the operation of said thermostat.

20. In an electric cooking device, the combination of an inner receptacle and an outer casing, an electric heating circuit for said receptacle including a thermostatic unit readily detachably mounted in association with said inner receptacle, said unit including means for adjusting the same, and means mounted in said outer casing for operation of said adjusting means, and means for readily detachably connecting said first and second named means.

21. In an electric cooking device, the combination of a casing, an electric heating circuit including a thermostat disposed within said casing, means for adjusting said thermostat, means for setting said thermostat including a means rotatably mounted in said casing and having means cooperating with said first-named means to provide a readily detachable connection therebetween, and a lamp socket in said circuit disposed within said rotatable means but non-rotatively mounted with respect to said means on said casing.

22. In an electric cooking device, the combination of a casing having an opening, an electric heating circuit including a thermostat disposed within said casing, a lamp socket non-rotatively supported by said casing, a lamp fitting in said socket and extending through said opening, means for controlling said thermostat, said means including a sleeve mounted in said casing at said opening and embracing said lamp socket, said sleeve having means for adjusting said thermostat, and means mounted on said sleeve exteriorly of said casing for rotating said sleeve.

23. In an electric cooking device, the combination of a casing having an opening, an electric heating circuit including a thermostat disposed within said casing, a lamp socket non-rotatively supported by said casing, a lamp fitting in said socket and extending through said opening, means for controlling said thermostat, said means including a sleeve mounted in said casing at said opening and embracing said lamp socket, said sleeve having means for adjusting said thermostat, said sleeve being insulated from said lamp socket, and means mounted on said sleeve exteriorly of said casing for rotating said sleeve.

24. In an electric cooking device, the combination of an inner receptacle and an outer casing, an electric heating circuit for said receptacle including a thermostatic unit mounted in association with said inner receptacle, said unit including means for adjusting the same, means mounted in said outer casing for operation of said adjusting means, and means for readily detachably connecting said first and second named means.

25. In an electric cooking device, the combination of a casing, an electric heating circuit disposed within said casing and including a thermostatic unit readily detachably mounted for operation within said casing, said unit including means for adjusting the same, means mounted in said casing for operation of said adjusting means, and means for readily detachably connecting said first and second named means.

26. In an electric cooking device, the combination of a casing, an electric heating circuit within said casing including a thermostat having means for varying the operation of said circuit, means rotatably mounted in said casing cooperating with said first-named means for setting said thermostat, and a pilot light for said circuit mounted within said means and non-rotative with respect to said casing.

ALVA T. SMITH.
HERBERT J. MOON.